United States Patent [19]

Beleckis et al.

[11] 4,426,007
[45] Jan. 17, 1984

[54] STORAGE FILE FOR MAGNETIC RECORDING DISKS

[75] Inventors: Vytautas K. Beleckis, East Longmeadow; Raymond T. Cassidy, Ashfield, both of Mass.

[73] Assignee: Dennison National Company, Holyoke, Mass.

[21] Appl. No.: 295,997

[22] Filed: Aug. 25, 1981

[51] Int. Cl.³ ............................................. A47F 7/00
[52] U.S. Cl. .................................... 211/40; 40/398; 40/400; 211/47; 211/169
[58] Field of Search ............... 211/40, 47, 48, 11, 211/41, 169, 168, 96; 40/379, 383, 398, 400, 388, 390, 403; 312/8, 9, 10

[56] References Cited

U.S. PATENT DOCUMENTS

| 2,959,877 | 11/1960 | Deinlein | 40/400 |
| 3,712,477 | 1/1973 | Kieves | 211/40 |
| 4,074,450 | 2/1978 | Schweinsberg | 40/403 |
| 4,084,699 | 4/1978 | Koepke | 211/11 |
| 4,305,510 | 12/1981 | Eppy | 211/40 |

FOREIGN PATENT DOCUMENTS 2203625  8/1972  Fed. Rep. of Germany ........ 211/40

Primary Examiner—Ramon S. Britts
Assistant Examiner—Robert W. Gibson, Jr.
Attorney, Agent, or Firm—Chapin, Neal & Dempsey

[57] ABSTRACT

A filing unit for storage and retrieval of magnetic recording disks is disclosed. The unit includes a plurality of pockets or storage panels which can be removably stored in a modular holder and the holder itself can be combined with various other filing components, such as a storage binder having front and rear covers or a desktop filing stand. In the preferred embodiment, the pocket is carried by a file bar affixed along one edge thereof. The holder includes a plurality of parallel channels each adapted to pivotally receive the file bar of a storage panel. Each channel includes retaining lugs which straddle the channel and are flexible to permit snap-insertion and removal of the bar from the holder.

5 Claims, 9 Drawing Figures

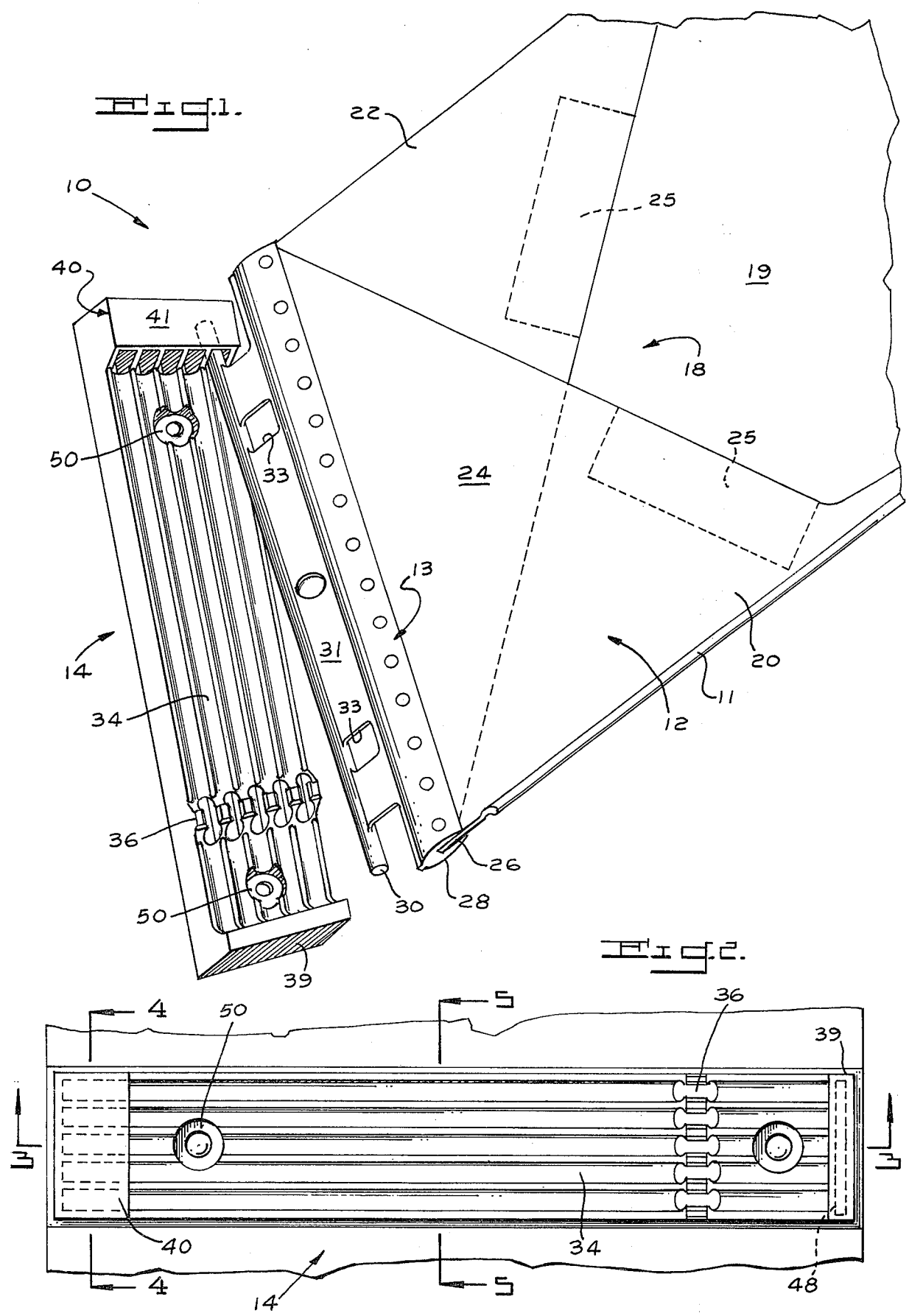

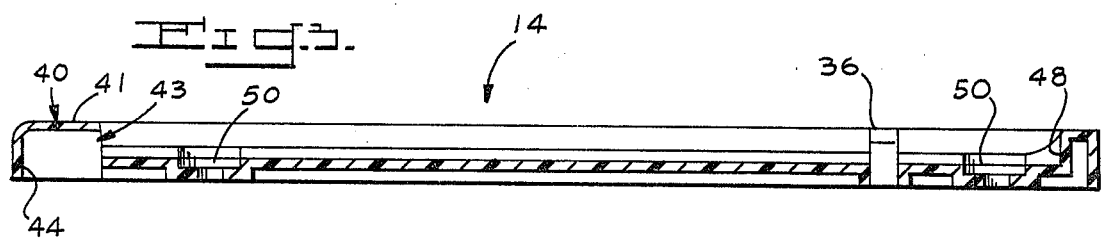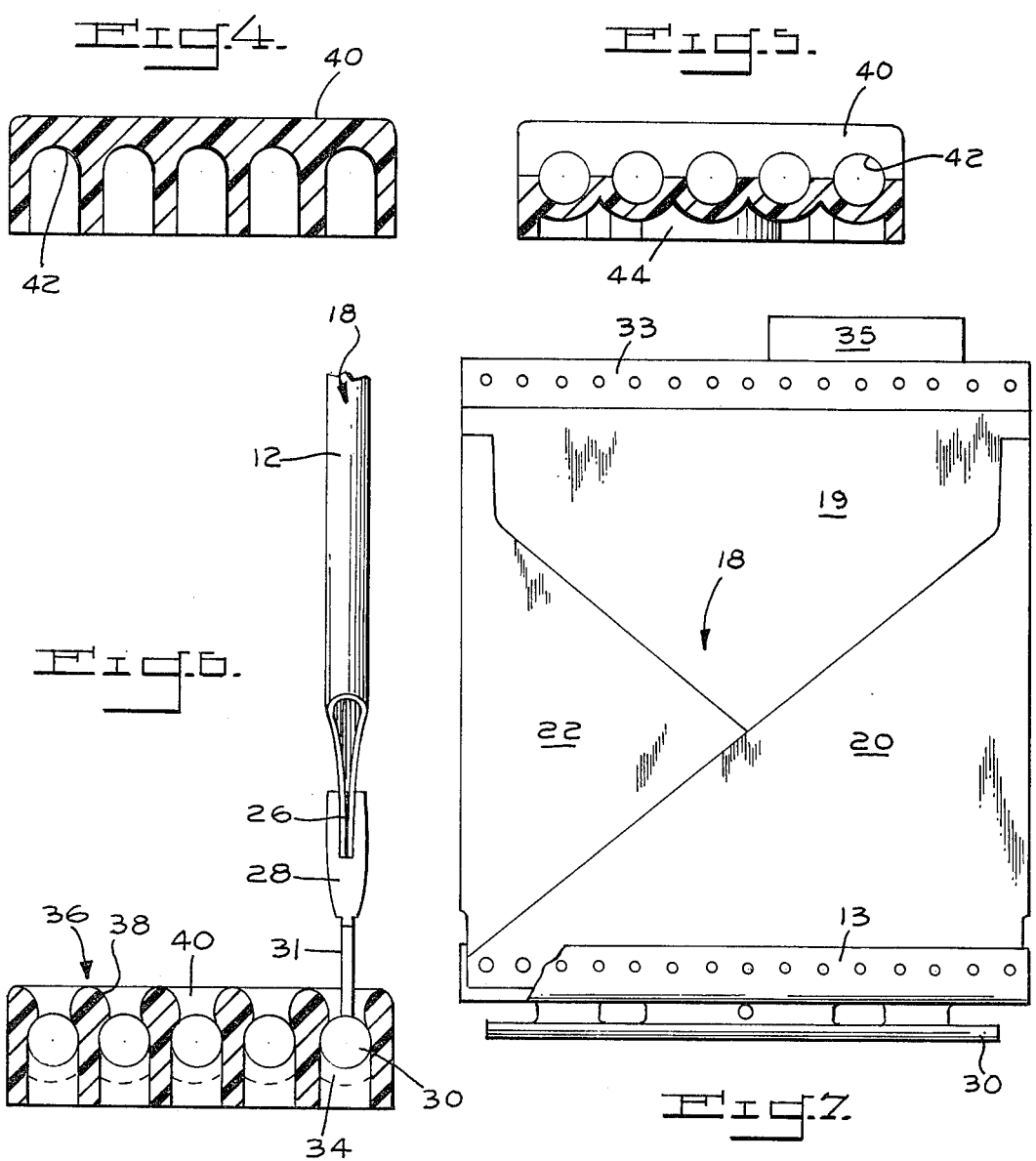

U.S. Patent   Jan. 17, 1984   Sheet 3 of 3   4,426,007

STORAGE FILE FOR MAGNETIC RECORDING DISKS

BACKGROUND OF THE INVENTION

The present invention relates to filing systems for flexible magnetic recording disks frequently referred to in the trade as "floppy disks".

Floppy disks are widely used in small computer and word processing equipment, such as the computer-operated recorder typewriters found in modern offices. Although this invention is especially adapted for storage of these disks, it will be recognized that the invention may also be used with other recording media.

Storage of floppy disks presents particular problems in that, for maximum utility, the disks must be securely stored in such a manner that they are protected from warping or bending, yet readily available for identification and use. Some prior filing systems, such as the ones disclosed in U.S. Pat. Nos. 3,502,222 to Crafoord and 4,074,450 to Schweinsberg, use pivoted or hinged storage units for floppy disks. While these systems are adequate for filing purposes, they lack versatility for use with various types of filing units. In addition, the units are relatively expensive and complex in construction and the individual holders are not adapted for easy insertion and removal from their associated file or support members.

Moreover, these prior art disk holders are not readily adapted for universal use in other filing modes, e.g., stands, carrousels and file-drawer suspension caddies, which may be preferred by a purchaser. Further, these known systems have a limited storage capacity and often cannot be expanded as the user's needs grow.

Accordingly, it is the principal object of the present invention to provide a modular filing unit for improved storage and retrievel of floppy disks, wherein the unit is adapted to be combined with a variety of products such as binder covers, desk reference stands, desk-drawer suspension caddies, and carrousels without modification of the basic unit.

It is another object to provide a pivotable storage unit for a floppy disk of simple and economical construction that can be snapped into, or out of, a unique storage module which can be mounted in a binder with a front and rear cover, desk-drawer storage device, or a desk-top storage stand.

It is a further object to provide a filing system which allows for ready expansion of storage capacity as the user's needs grow.

It is another object to provide a new semi-rigid storage unit open at one edge for ease of use but which securely retains the disk therein and reveals the label-bearing portion of the disk for easy reference.

The above and other objects and advantages of this invention will become more readily apparent when the following description is read in conjunction with the accompanying drawings.

BRIEF DESCRIPTION OF THE DRAWING

FIG. 1 is a perspective view of a storage unit and modular holder of the type embodying the present invention;

FIG. 2 is a front elevational view of the holder rotated to a horizontal position;

FIG. 3 is a cross-sectional view of the holder taken along line 3—3 of FIG. 2;

FIG. 4 is a cross-sectional view of the holder taken along line 4—4 of FIG. 2;

FIG. 5 is a cross-sectional view taken along line 5—5 of FIG. 2;

FIG. 6 is a cross-sectional view of the holder similar to FIG. 5 but with a storage unit inserted therein;

FIG. 7 is an overall view of a storage unit;

DETAILED DESCRIPTION OF THE PREFERRED EMBODIMENT

Figure 8:
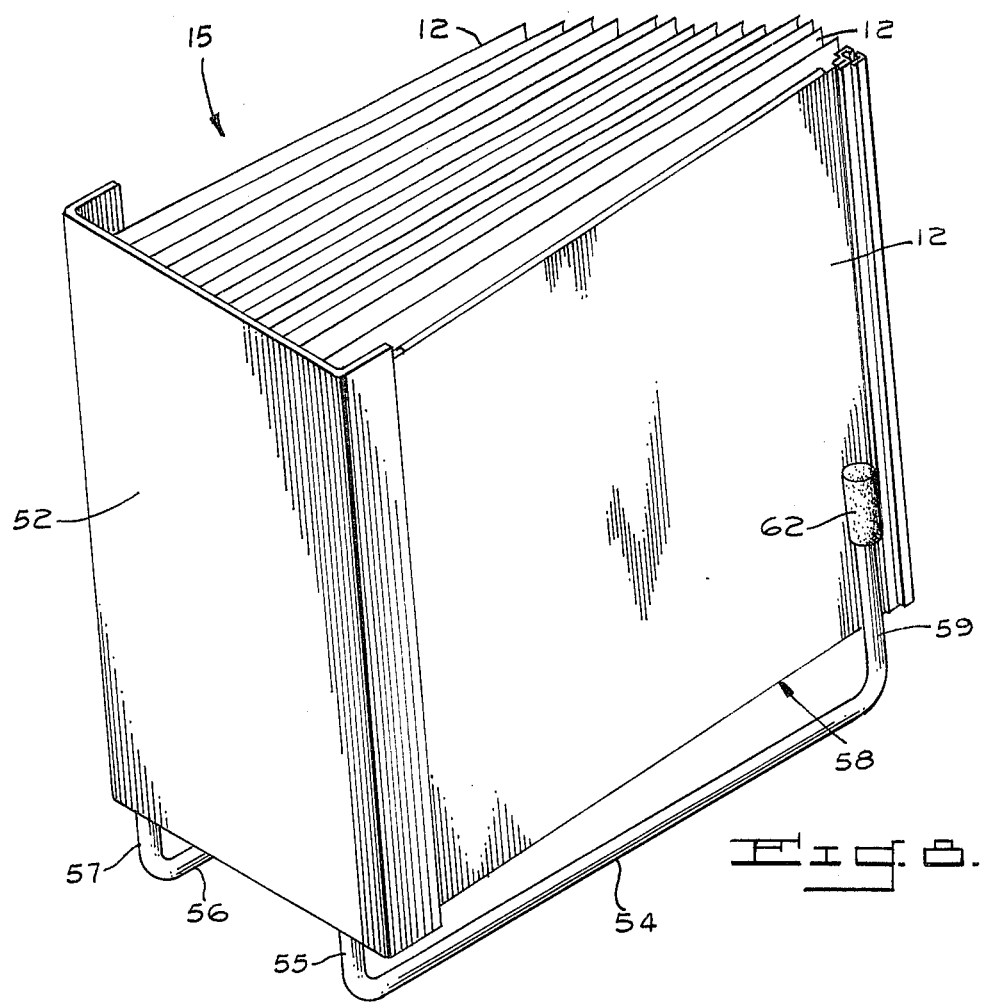
FIG. 8 is a perspective view of a desk-top reference stand of the type embodying the present invention.

Referring to the drawings in detail, a modular file unit for floppy disks is shown in FIG. 1 and generally designated by the reference numeral 10. The file unit includes a flexible disk storage unit comprising an envelope or pocket 11 having a file bar 13 disposed along the inner edge thereof. The pocket and bar 13 form a storage panel indicated generally at 12 in FIG. 1 which can be selectively snap-fitted into, or out of, holder bar or spine member 14. The spine member 14 is adapted to support a plurality of panels in adjacent pivotable relationship. The holder 14 can be combined with various other components to provide a variety of filing systems.

The pocket 11 is formed by folding a unitary sheet of die-cut, semi-rigid plastic, such as polyethylene or the like. The pocket includes a back panel 19 and a pair of diagonally opposed, overlapping flaps 20, 22 which define a generally V-shaped opening 18.

To house a disk, the disk is merely slipped into the opening 18 in the pocket formed by the back panel 19 and flaps 20 and 22. The semi-rigid, V-shaped front 24 covers most of the working surface of the disk to prevent the disk from being damaged, yet its V-shape exposes the disk label for easy reference.

Each of the flaps 20, 22 has a small tab 25 disposed along its marginal edge and folded inwardly so that its free edge abuts back panel 19. Because of the semi-rigid and resilient nature of the plastic which forms the pocket, the tabs exert a spring-like pressure against a disk and thereby prevent it from accidentally slipping out of the pocket.

As best shown in FIG. 1, a file bar member 13 is affixed along the closed inner edge 26 of each pocket 11 to form a pivotable storage panel 12. The bar member 13 comprises a U-shaped rib portion 28, a rod portion 30 and an interconnecting web 31. The rib 28 is preferably bonded onto the pocket 11 by a heat-sealing process in which spaced holes are first punched along its edge 26. Heat is then applied to the plastic rib so that the plastic will flow through the holes along edge 26 to thereby form a series of beads which lock the rib firmly in place to form panel 12.

As shown in FIG. 7, the panel 12 also includes a plastic strip 33 disposed on its outer edge for slidably housing a transparent plastic holder 35 for an index tab. Strip 33 is preferably affixed to panel 12 by the same heat-sealing process used to connect strip 28 to the other edge of the panel 12. The index tab provides a quick reference to identify the data stored on a filed disk.

Panel holder 14 is preferably an injection-molded plastic bar or post member comprising a plurality of spaced, parallel channels 34, each adapted to releasably retain the rod portion 30 of a panel 12. The holder bar includes retaining means 36 in the form of laterally-spaced lugs or projections 38 (FIG. 6) which are spaced apart less than the diameter of the rod 30 so as to provide for snap fit of the rod 30 therebetween. The channels 34 are preferably of semi-cylindrical cross section and the rod 30 a cylinder for easy pivotable or swinging movement of the panels when mounted in the holder 14. The web 31 of each panel includes a pair of cutouts 33 which are disposed to register with the retaining means 36 to permit free pivotable movement of a panel 12 relative to the holder without interference by the retaining projections 36. Two cutouts 33 provide for such free-swinging movement regardless of the end-to-end reversal of a panel 12 when inserted into the holder bar 14.

The panel holder 14 also includes end caps 39 and 40, one of which provides the base and the other the top of the holder 14 depending on the orientation of holder. As shown in FIG. 1, end cap 40 which is disposed upwardly includes a transverse wall 41 spaced outwardly of the inner surfaces of the channels 34 so as to provide downwardly facing openings or cavities 43 which retain the upper ends of the rods 30 securely within the holder. A panel 12 can only be removed from the holder 14 by first swinging or pivoting its lower end outwardly of the retaining lugs 36 and then moving the panel longitudinally downward so that the end of rod 30 is withdrawn from the cavity 43.

A pair of longitudinally-spaced, counter-sunk holes 50 are provided through the back wall of the holder to enable the holder to be attached to a variety of additional components such as a binder cover or desk-top stand 15.

To attach a panel 12 to the holder bar, one end of the rod 30 is inserted into opening 43 and the other end of the bar is pivoted toward the aligned channel 34 and pressed against the retainer lugs 38 so that the rod 30 will snap into the channel 34 where it is firmly held in place by the top wall 41 and the retaining means 36.

Figure 9:
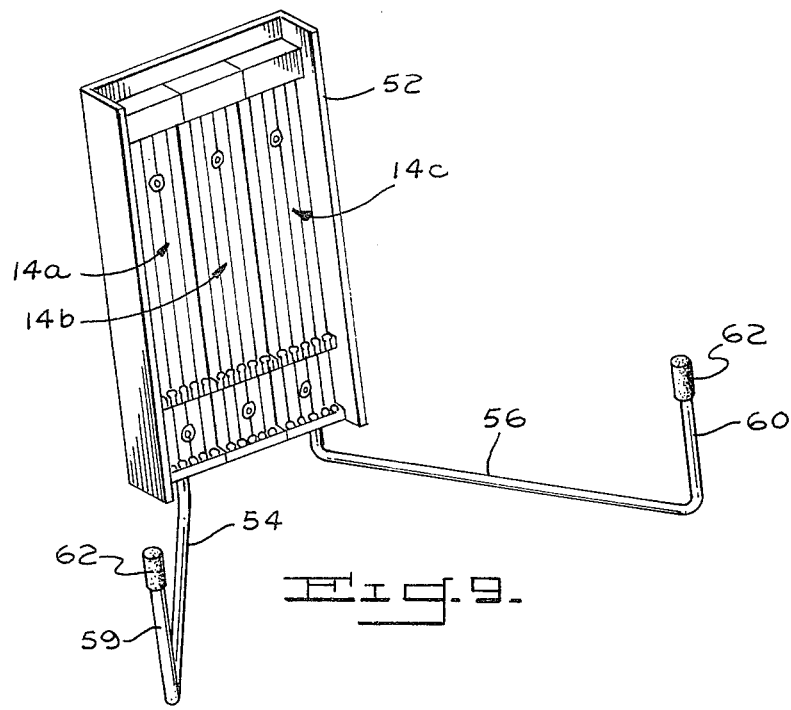
FIG. 9 is a perspective view of the desk stand of FIG. 8 but with the storage panels removed.

A desk-top stand 15 is shown in FIGS. 8 and 9 and comprises a plurality of holders, 14a, 14b, 14c attached in side-by-side relations within U-shaped binder or backing member 52. A pair of U-shaped legs 54, 56 include upwardly-extending limbs 55 and 57 by which the legs are pivotably connected to the lower, inner surface of the backing member 52. At their outer ends, the pivotable legs include upwardly-extending limbs 59 and 60 with protective plastic caps 62 fitted over the terminal ends of the legs. Preferably the lower limbs of 54 and 56 are disposed at an obtuse angle to the upright portions which are pivotably connected to the backing member 52 so that the panels will be tilted upwardly about 5–10. for easier pivotable movement of the panels. The legs serve not only as a base to support the filing stand or binder in an upright condition but also act to close and open the binder by limiting the pivotable movement of the panels. When the legs 54 and 56 are swung parallel or closed, their upwardly-extending limb portions engage the outer panels 12 housed in the stand and prevent the swinging movement thereof. In a sense, the stand is "closed", i.e., in its most compact condition. When the disks are to be used, it is merely required for the user to grasp the upwardly-extending limbs of the legs and swing them open to any suitable oblique angle. The user can then swing or fan through the panels to select the particular one needed for the task at hand. After each usage, the legs may simply be swung together until they clamp the panels in parallel relationship.

As will be recognized from the desk-top stand at 15 shown in FIGS. 8 and 9, a plurality of holder bars can be readily combined with various other support members or binders to accommodate the user's requirements. Since the holders are of molded synthetic plastic construction, they are preferably identical in construction and, in effect, provide the root element of a modular, flexible disk storage and filing system. In addition, the file bars 13 can also be molded or extruded and cut to desired length. As described above, the pocket portion of the panels can be die cut folded and heat-sealed onto a file bar 13 in an inexpensive and rather simple manufacturing process. Thus, with three simple structural elements, the two basic components of a modular filing system can be readily fabricated to provide the storage panels for floppy disks and the holder bars for filing these panels and these elements can be combined with a variety of other supports, housing or filing components.

It should be understood that obvious structural modifications can be made without departing from the spirit of the invention. Accordingly, reference should be made primarily to the accompanying claims, rather than to the detailed description of the preferred embodiment, to determine the scope of the invention.

Having thus described the invention, what is claimed is:

1. A filing unit comprising:
   (a) A storage panel including a pocket formed by folding a unitary sheet of resilient synthetic plastic and being open along one edge for housing magnetic recording disks and the like, one face of the pocket being formed by overlapped flaps and a mounting rod disposed along an edge of said pocket;
   (b) a panel holder having a plurality of spaced, parallel channels with a cavity at one end thereof opening toward said channels to receive one end portion of the mounting rod when the rod is fitted longitudinally into one of said channels, and
   (c) said holder including retaining means comprising resilient detents which are spaced apart less than the diameter of said mounting rod for receiving the rod when it is moved angularly into one said channels, said rod pivotably interfitting within each of said channels so that the storage panels may be pivoted about the longitudinal axis of said rod.

2. Filing unit as set forth in claim 1, wherein an integral channel strip is bonded along one edge of said pocket; said mounting rod being disposed outwardly of said channel strip and a web portion interconnecting said strip and rod.

3. Filing unit as set forth in claim 1, wherein at least one of said flaps includes an inwardly folded resilient tab portion for engaging the surface of a disk disposed within the pocket to retain said disk frictionally within said pocket.

4. Filing unit as set forth in claim 2, wherein said channel strip is thermally bonded onto said pocket and said web portion includes at least one cut-out disposed to register with said resilient detents to permit the pivotable movement of said storage panel relative to said panel holder.

5. Filing unit comprising a plurality of holders affixed in side-by-side relation to a backing member, each of said holders being of integral, molded construction, having a number of spaced, parallel channels, a plurality of storage panels including a pocket portion for housing magnetic recording disks and the like, and an elongated mounting rod disposed along one edge of said pocket portion, the size and shape of said rod relative to each of said channels being such that the rod will pivotably interfit within each of said channels, said holders including opposed, resilient detents spaced apart less than the diameter of said rod for the snap-fitting insertion and removal therethrough of said rod upon angular movement relative to one of said channels, said backing member being supported in a generally upright position by a pair of pivotable, laterally-spaced legs, each of said legs including an upwardly extending limb engageable with the outer panels pivotably mounted in said filing unit to prevent the pivotable movement of said panels when said legs are swung to generally parallel relation and to permit the panels to be swung outwardly when the legs are moved apart to an oblique angle.

* * * * *